March 15, 1932. M. H. CRIMMINS 1,849,614
COMPENSATING SLIDE VALVE FOR INTERNAL COMBUSTION ENGINES
Filed April 9, 1928
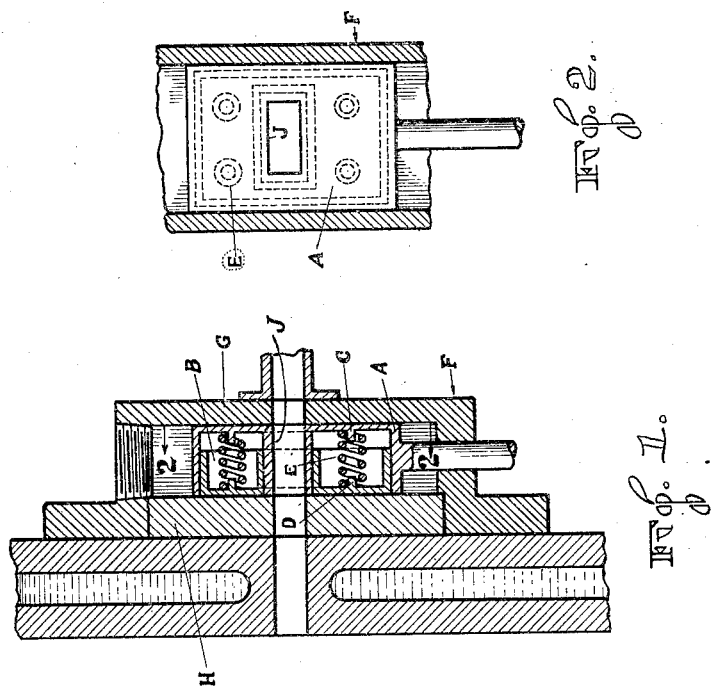
Inventor
MURRELL H. CRIMMINS
By Munn & Co.
Attorneys Patented Mar. 15, 1932

1,849,614

UNITED STATES PATENT OFFICE

MURRELL H. CRIMMINS, OF BOONE, IOWA

COMPENSATING SLIDE VALVE FOR INTERNAL COMBUSTION ENGINES

Application filed April 9, 1928. Serial No. 268,588.

My invention relates to improvements in a valve for internal combustion engines, and it consists in the combinations, constructions, and arrangements hereinafter described and claimed.

An object of my invention is to provide a valve for an internal combustion engine especially designed to function in a two cycle engine. The valve is constructed of two parts and these parts are movable with respect to each other so as to automatically take up wear.

A further object of my invention is to provide a device of the type described which is extremely simple in construction and which is durable and efficient for the purpose intended.

Other objects and advantages will appear in the following specification, and the novel features of my invention will be particularly pointed out in what I hereinafter claim.

My invention is illustrated in the accompanying drawings, forming a part of this application, in which Figure 1 is a sectional view through the valve; and Figure 2 is a section along the line 2—2 of Figure 1.

In carrying out my invention I provide a valve, clearly shown in Figure 2, and this valve is composed of two parts indicated by the letters A and B. The part B is received within the part A and is adapted to move within the part. The parts A and B carry projections C and D, which are aligned with each other and serve as securing means for springs E. It is obvious that other fastening means may be provided without departing from the spirit and the scope of my invention.

The principal point is to dispose a spring between two movable parts, this spring causing the parts to move away from each other.

The valve is mounted in a casing F. The spring E tends to move the part A against the wall G, and the part B against the wall H. In this way the wear is automatically taken up between the valve and the valve casing.

The valve is provided with a port or opening J.

Although I have shown and described one embodiment of my invention, it is to be understood that the same is susceptible of various changes, and I reserve the right to employ such changes as may come within the scope of the invention as claimed.

I claim:

1. A slide valve comprising two box-shaped members, one being slidable within the other and having their marginal walls telescoping, each of the members having an inwardly-extending tubular portion telescoping with each other so as to provide a continuous sealed passageway through the valve, yet permitting movement of the members, and yielding means for urging the members apart.

2. A slide valve comprising two members, each of the members having tubular portions telescoping with each other so as to provide a continuous sealed passageway through the valve, yet permitting relative movement between the members, and yielding means disposed exteriorly of the telescoping portions and on opposite sides of the latter for urging the members apart without effecting binding action between the telescoping portions.

MURRELL H. CRIMMINS.